US011823661B2

(12) United States Patent
Agarwal et al.

(10) Patent No.: US 11,823,661 B2
(45) Date of Patent: *Nov. 21, 2023

(54) EXPEDITING INTERACTION WITH A DIGITAL ASSISTANT BY PREDICTING USER RESPONSES

(71) Applicant: Microsoft Technology Licensing, LLC, Redmond, WA (US)

(72) Inventors: Vipul Agarwal, Bellevue, WA (US); Rahul Kumar Jha, Redmond, WA (US); Soumya Batra, Bellevue, WA (US); Karthik Tangirala, Redmond, WA (US); Mohammad Makarechian, Seattle, WA (US); Imed Zitouni, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/103,098

(22) Filed: Nov. 24, 2020

(65) Prior Publication Data

US 2021/0082403 A1 Mar. 18, 2021

Related U.S. Application Data

(63) Continuation of application No. 16/212,662, filed on Dec. 6, 2018, now Pat. No. 10,878,805.

(51) Int. Cl.
*G10L 15/07* (2013.01)
*G06F 16/33* (2019.01)
(Continued)

(52) U.S. Cl.
CPC .......... *G10L 15/07* (2013.01); *G06F 16/3349* (2019.01); *G10L 15/22* (2013.01);
(Continued)

(58) Field of Classification Search
CPC ........ G06F 16/3349; G06F 3/16; G06F 3/167; G10L 15/07; G10L 15/22; G10L 2015/223; G10L 2015/225
(Continued)

(56) References Cited

U.S. PATENT DOCUMENTS 7,620,549 B2 * 11/2009 Di Cristo .............. G06F 40/232
704/251
8,332,224 B2 * 12/2012 Di Cristo ................ G10L 15/08
704/251
(Continued)

FOREIGN PATENT DOCUMENTS

EP        3251115 B1    12/2018
WO    2017091883 A1     6/2017
(Continued)

OTHER PUBLICATIONS

"Office Action Issued in European Patent Application No. 19824135. 8", dated Nov. 8, 2022, 12 Pages.
(Continued)

*Primary Examiner* — Quynh H Nguyen
(74) *Attorney, Agent, or Firm* — SHOOK, HARDY & BACON L.L.P.

(57) ABSTRACT

A computer-implemented technique is described herein for expediting a user's interaction with a digital assistant. In one implementation, the technique involves receiving a system prompt generated by a digital assistant in response to an input command provided by a user via an input device. The technique then generates a predicted response based on linguistic content of the system prompt, together with contextual features pertaining to a circumstance in which the system prompt was issued. The predicted response corresponds to a prediction of how the user will respond to the system prompt. The technique then selects one or more dialogue actions from a plurality of dialogue actions, based
(Continued)

on a confidence value associated with the predicted response. The technique expedites the user's interaction with the digital assistant by reducing the number of system prompts that the user is asked to respond to.

20 Claims, 10 Drawing Sheets

(51) Int. Cl.
    *G10L 15/22*     (2006.01)
    *G06F 3/16*     (2006.01)

(52) U.S. Cl.
    CPC .......... *G06F 3/16* (2013.01); *G10L 2015/223* (2013.01); *G10L 2015/225* (2013.01)

(58) Field of Classification Search
    USPC ....................................................... 704/270
    See application file for complete search history.

(56) References Cited

U.S. PATENT DOCUMENTS

| | | | | |
|---|---|---|---|---|
| 8,620,659 | B2* | 12/2013 | Di Cristo | G06F 40/232 |
| | | | | 704/251 |
| 9,626,959 | B2* | 4/2017 | Di Cristo | G10L 15/08 |
| 9,965,035 | B2* | 5/2018 | Santamaria | H04L 67/1095 |
| 10,083,002 | B2* | 9/2018 | Clark | G10L 15/1822 |
| 10,200,237 | B1* | 2/2019 | Gupta | G06N 20/00 |
| 10,250,641 | B2* | 4/2019 | Porras | H04L 63/20 |
| 10,419,381 | B2* | 9/2019 | Burdakov | H04L 51/32 |
| 10,679,611 | B2* | 6/2020 | Chao | G10L 15/183 |
| 10,878,805 | B2* | 12/2020 | Agarwal | G06F 3/167 |
| 10,896,672 | B2* | 1/2021 | Chao | G10L 15/14 |
| 2007/0038436 | A1* | 2/2007 | Cristo | G10L 15/22 |
| | | | | 704/E15.04 |
| 2007/0050191 | A1* | 3/2007 | Weider | G10L 15/1815 |
| | | | | 704/E15.04 |
| 2011/0131036 | A1* | 6/2011 | DiCristo | G10L 15/08 |
| | | | | 704/9 |
| 2013/0124550 | A1* | 5/2013 | Oel | G01C 21/3608 |
| | | | | 707/758 |
| 2014/0108013 | A1* | 4/2014 | Di Cristo | G10L 15/08 |
| | | | | 704/254 |
| 2014/0365913 | A1* | 12/2014 | Santamaria | G06F 3/04842 |
| | | | | 715/748 |
| 2016/0196499 | A1 | 7/2016 | Khan et al. | |
| 2016/0219048 | A1* | 7/2016 | Porras | H04L 63/20 |
| 2017/0329848 | A1* | 11/2017 | Goodman | G06F 3/167 |
| 2018/0063062 | A1* | 3/2018 | Burdakov | H04L 51/32 |
| 2018/0253148 | A1* | 9/2018 | Santamaria | G06F 9/451 |
| 2018/0293484 | A1* | 10/2018 | Wang | G06F 16/638 |
| 2018/0315427 | A1 | 11/2018 | Kwon et al. | |
| 2018/0330722 | A1 | 11/2018 | Newendorp et al. | |
| 2018/0336010 | A1* | 11/2018 | Mukherjee | H04L 67/141 |
| 2019/0318724 | A1* | 10/2019 | Chao | G10L 15/32 |
| 2020/0135187 | A1* | 4/2020 | Chao | G10L 15/005 |
| 2020/0184956 | A1* | 6/2020 | Agarwal | G10L 15/07 |
| 2021/0082403 | A1* | 3/2021 | Agarwal | G10L 15/22 |

FOREIGN PATENT DOCUMENTS

| | | |
|---|---|---|
| WO | 2018035248 A1 | 2/2018 |
| WO | 2018151766 A1 | 8/2018 |

OTHER PUBLICATIONS

"Office Action Issued in European Patent Application No. 19824135.8", dated Apr. 17, 2023, 8 Pages.

"Office Action Issued in Indian Patent Application No. 202147026009", dated Dec. 29, 2022, 5 Pages.

* cited by examiner

EXAMPLE 3

← 402

User: Book two tickets to the new Avenger movie

DA: At which Theater should I book the tickets?

User: Lincoln Square Cinemas

DA: For when?

User: 7:30 PM

DA: OK, booked

} WITHOUT PREDICTION

⇩

User: Book two tickets to the new Avenger movie for 7:30PM

DA: At which Theater should I book the tickets?

Prediction: Lincoln Square (*with high confidence*)

Feedback Input: Lincoln Square

DA: For when?

Prediction: 7:30 PM (*with lower confidence*)

Prediction System Response to User: At Lincoln Center at 7:30PM?

User: Yes

Feedback input: 7:30PM

DA: OK, booked

} WITH PREDICTION

FIG. 4

| System Prompt | Example Contextual Features | User Response |
|---|---|---|
| Which one would you like to call? James Chu, James Patterson, or James Goldberg? | Previous_user_query = "Call James"; Current_skill = Skill.Calling; Time_of_day = 6:15 pm; Previous_skill = Skill.Music; User_location = "labeledLocation:Office" | James Patterson |
| Which theater should I book the ticket in? | Previous_user_query = "Book 2 tickets for the Avengers movie for 7:30 pm"; Current_skill = Skill.Reservations; TimeOfDay = 7:00 pm; Previous_skill = Skill.Calling; User_location = "labeledLocation:Home" | Lincoln Square Cinemas |
| Where would you like to go? | Previous_user_query = "Start Uber"; Current_skill = Skill.Taxi; TimeOfDay = 7:20 pm; Previous_skill = Skill.Reservations; User_location="absoluteLocation: 100 Bellevue Way SE, Bellevue, WA 98004" | Lincoln Square Cinemas |
| ⋮ | ⋮ | |

EXPEDITING INTERACTION WITH A DIGITAL ASSISTANT BY PREDICTING USER RESPONSES

CROSS REFERENCE TO RELATED APPLICATION

This application is a continuation of application Ser. No. 16/212,662, filed Dec. 6, 2018, now U.S. Pat. No. 10,878,805, which application is incorporated herein by reference in its entirely.

BACKGROUND

A digital assistant refers to a virtual agent for answering a user's queries, typically via a multi-turn dialogue. In a common case, the user begins by entering an initial command, such as, "Make a hotel reservation in New York." The digital assistant then identifies the time, place, and other particulars of the reservation through a series of system prompts. To perform this task, the digital assistant typically relies on one or more skills components. Each skill component is configured to handle a particular task, such as making a restaurant reservation, controlling a media system, retrieving news, etc.

While digital assistants are becoming ubiquitous in our lives, these agents sometimes exhibit non-optimal performance. For example, a user may grow frustrated with the amount of time it takes a digital assistant to understand and perform a task. The user may become particularly frustrated whenever the digital assistant misinterprets the user's input query or response, which forces the user to correct the course of the transaction. Further, a digital assistant does not necessarily improve over time through repeated use. It may require the user to undergo the same time-consuming dialogue each time the user performs a similar transaction.

Digital assistant platform developers and skill component developers have independently attempted to address these concerns by building more intelligent digital assistant platforms and skill components, respectively. For example, a skill component developer may attempt to build a skill component that learns information about entities with which a user regularly interacts. But these separate efforts have not contributed to the development of a consistent personalization service across the various components associated with a digital assistant. Indeed, in some cases, the skill components may include proprietary logic which remains opaque to a platform developer; here, the platform developer will have difficulty utilizing any insight captured by these skill components.

SUMMARY

A computer-implemented technique is described herein for expediting a user's interaction with a digital assistant. In one implementation, the technique involves receiving a system prompt generated by the digital assistant. The digital assistant generates this system prompt in response to an input command provided by a user via an input device. The technique then generates a predicted response based on linguistic content of the system prompt, together with contextual features pertaining to a circumstance in which the system prompt was issued. The predicted response corresponds to a prediction of how the user will respond to the system prompt. The technique then selects one or more dialogue actions from a plurality of dialogue actions, based on a confidence value associated with the predicted response.

A first dialogue action involves feeding the predicted response into the digital assistant as a proxy user response to the system prompt, without outputting the predicted response or the system prompt to the user via an output device. A second dialogue action involves instructing the digital assistant to send the original system prompt to the user via the output device. A third dialogue action involves sending a confirmation prompt to the user via the output device; the confirmation prompt asks the user to confirm the predicted response (e.g., by confirming the predicted response itself, and/or an action that is based on the predicted response).

According to one aspect, the technique generates the predicted response based on a data store that contains a plurality of record entries. Each record entry contains: a previously-generated system prompt; a set of contextual features pertaining to a circumstance in which the previously-generated system prompt was issued; and a previously-encountered user response to the previously-generated system prompt.

The technique has various technical features. According to a first aspect, it expedites the user's interaction with the digital assistant by reducing the number of system prompts that the user is asked to respond to. According to a second aspect, it helps the digital assistant interpret ambiguous user commands by leveraging information regarding a user's prior corrective responses. This aspect also reduces the need to ask the user for clarification regarding the user's initial utterance. According to a third aspect, the technique personalizes a digital assistant for use by a user in a manner that is external to, and largely agnostic to, the various skill components used by the digital assistant. This aspect facilitates the introduction of the technique into an already-built digital assistant; it further allows the technique to be used to supplement the operation of many different kinds of digital assistants. According to a fourth aspect, the technique relies, in part, on the surface or "raw" form of linguistic expressions. This aspect simplifies the storage and processing of this information in the generation of predicted responses.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2-5 show four respective examples of the operation of the computing environment of FIG. 1.

FIG. 9 shows an example of record entries produced by the prediction system of FIGS. 1 and 6.

Figure 1:
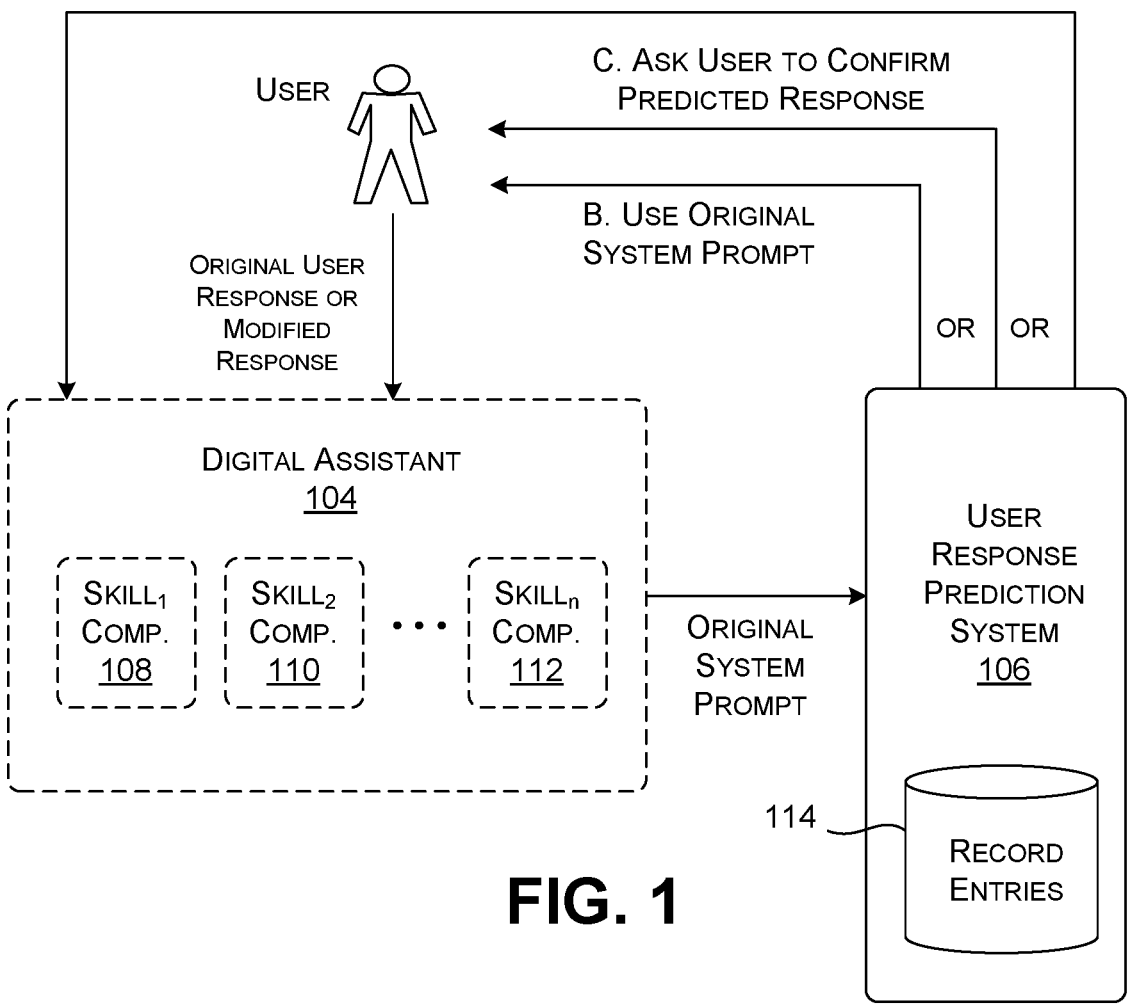
FIG. 1 shows an illustrative computing environment that involves a digital assistant and a user response prediction system ("prediction system").

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for expediting a user's interaction with a digital assistant. Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry. The term "component" or "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuity of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

FIG. 1 shows an illustrative computing environment 102 that involves a digital assistant 104 and a user response prediction system ("prediction system") 106. One or more computing devices implement the digital assistant 104 and the prediction system 106. A digital assistant 104 refers to a software agent configured to respond to questions posed by a user in a multi-turn dialogue in a natural language (e.g., English, French, Japanese, etc.). Any natural language expression made by the prediction system 106 is referred to herein as a "system prompt." Any natural language expression issued by the user is referred to herein as a "response," "command," "query," or "input expression."

The principal purpose of the prediction system 106 is to predict the manner in which the user will respond to a system prompt. For example, assume that the system prompt asks the user how many people will attend a dinner being planned at a restaurant. The prediction system 106 predicts what the user will say, in a natural language, in response to this question.

Figure 6:
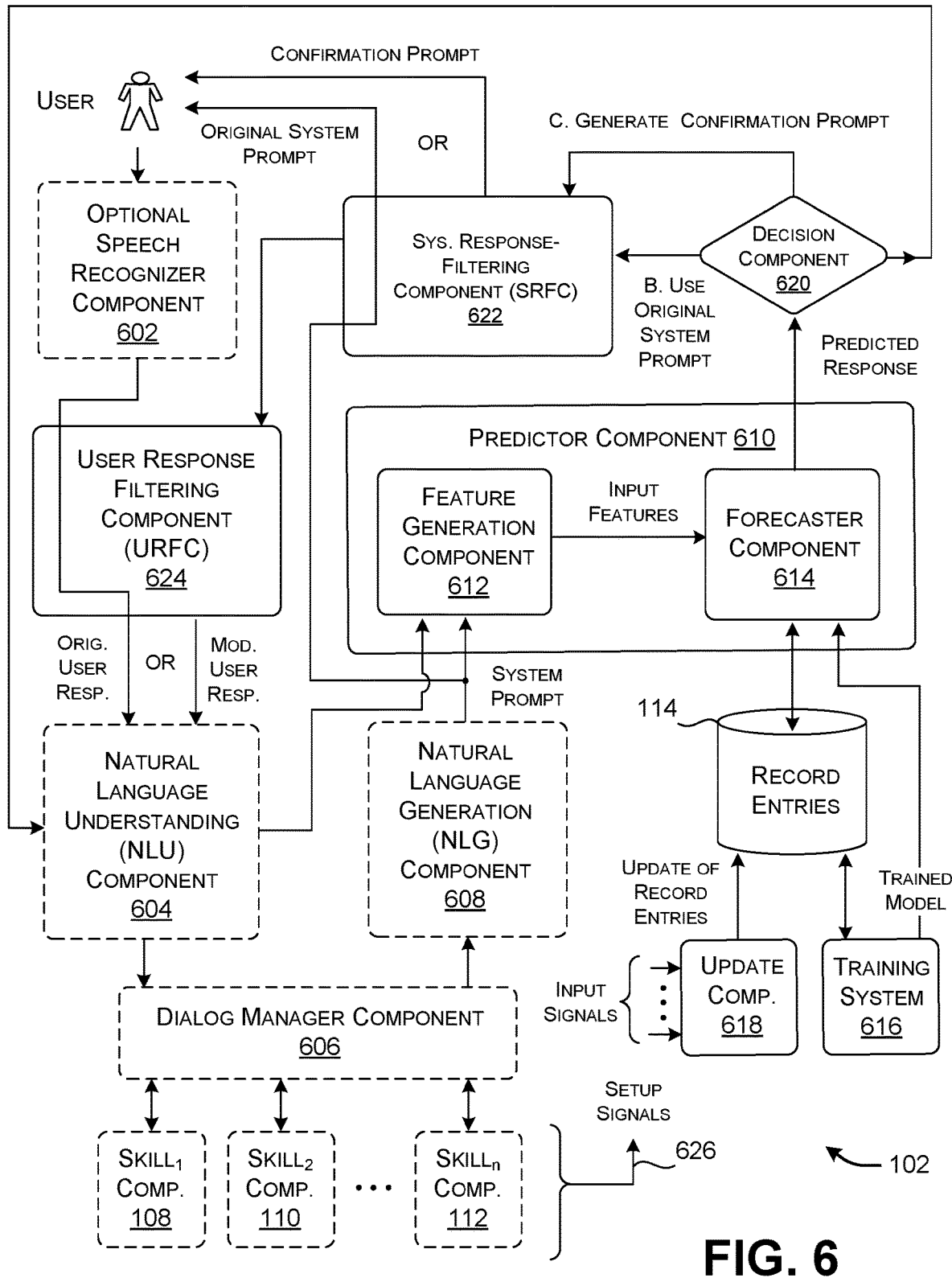
FIG. 6 shows one implementation of the computing environment of FIG. 1.

FIG. 1 shows that the prediction system 106 is a separate component from the digital assistant 104. However, as shown in FIG. 6, the functionality of the prediction system 106 may be enmeshed with the functionality of the digital assistant 104. Accordingly, the prediction system 106 may be understood as any assembly of components which collectively serve the task of predicting the user's response to system prompts, and then controlling the digital assistant 104 in response to its predicted responses.

One reason for showing the prediction system 106 and digital assistant 104 as separate components in FIG. 1 is to stress that the prediction system 106 works with the digital assistant 104 mainly on the "outside" of the digital assistant 104. That is, the prediction system 106 operates by governing the responses that are fed into the digital assistant 104 as input signals, rather than primarily changing the logic used by the digital assistant 104. For example, the digital assistant 104 can include one or more skill components (108, 110, . . . , 112). Each skill component refers to a logic module that is designed to handle a domain of questions posed by a user. The prediction system 106 performs its function without requiring changes to the logic used by these skill components (108, 110, . . . , 112). This characteristic facilitates the introduction of the prediction system 106 to an already-designed digital assistant 104, and enables the wide applicability of the prediction system 106 to different types of digital assistants. But note that a developer of a skill component can nevertheless take the existence of the prediction system 106 into account in the design of the skill component. For example, as will be explained in greater detail below, a skill component can send a setup signal which notifies the prediction system 106 of the extent to which the skill component wishes to make use of the services of the prediction system 106, if at all.

FIG. 1 summarizes different ways that the prediction system 106 can apply a predicted user response. In a first way (A), the prediction system 106 feeds the predicted response as an input signal back into the digital assistant 104, where it serves as a proxy user response. In this case, the prediction system 106 can preclude the digital assistant 104 from serving the system prompt. It thereby also eliminates the need for the user to respond to the system prompt. In other words, the prediction system 106 automatically answers whatever question is posed by the digital assistant 104.

In a second way (B), the prediction system 106 sends the original system prompt to the user, rather than the predicted response. The user then responds to the system prompt, to provide an actual user response. In this case, the prediction system 106 may discard the predicted response. Alternatively, the digital assistant 104 can still consume the predicted response in one or more of its stages. For example, the digital assistant 104 can use a speech recognizer component to convert speech signals into text information, and then use a natural language understanding (NLU) component to interpret the text information. Either of these units can leverage the predicted response to assist them in interpreting the forthcoming actual user response.

In a third way (C), the prediction system 106 can send a confirmation prompt to the user, rather than the original system prompt. The confirmation prompt asks the user to confirm the predicted response, e.g., by confirming the predicted response itself, and/or a proposed action that is based on the proposed response. In other cases, the confirmation prompt asks the user to confirm two more recent predicted responses made in two or more preceding cycles of prediction. Further note that the prediction system 106 can send a confirmation prompt before and/or after the digital assistant starts to perform an action to be confirmed. That is, in some cases, the confirmation prompt asks the user whether the digital assistant 104 is authorized to take a specified action; here, the digital assistant 104 will not take the action unless the user responds to the confirmation prompt in the affirmative. In other cases, the confirmation prompt tells the user that the digital assistant 104 will take, or is currently taking, or has already taken an action; here, the digital assistant 104 will carry out the action unless the user proactively cancels it or reverses it.

Note that the above three actions are not mutually exclusive. For instance, as will be described below, the prediction system 106 can pursue dialogue action (A) by feeding the predicted response back into the digital assistant 104. It can then pursue dialogue action (C) by sending a confirmation prompt to the user, which notifies the user of the action that has been performed. The confirmation prompt may also give the user the action to stop or reverse the action.

In one implementation, the prediction system 106 chooses action (A) whenever the confidence level associated with the predicted response is above a prescribed environment-specific threshold value, indicating that there is a high level of confidence associated with the predicted response. The prediction system 106 chooses action (B) whenever the confidence level associated with the predicted response is below a prescribed environment-specific threshold value, indicating that there is a relatively low degree of confidence associated with the predicted response. The prediction system 106 can choose action (C), prior to taking an action, when the confidence level associated with the predicted response falls into an environment-specific intermediary range. More generally, other implementations can use any combination of factors in deciding what action(s) to invoke.

The prediction system 106 generates each predicted response based on the "raw" linguistic content of a system prompt under consideration, together with a set of contextual features pertaining to a circumstance in which the system prompt was issued. For example, the contextual features can identify the user query that provoked the generation of the system prompt, the skill component that was used to generate the system prompt, the time at which the user issued the user query, the location from which the user issued the user query, and so on.

The prediction system 106 can use any technology to map the system prompt (and its contextual features) to a predicted response. In one case, the prediction system 106 treats the task as an information retrieval problem. In this framework, the prediction system 106 attempts to match the current system prompt, together with its contextual features, to a previously-generated system prompt stored in a data store 114. More specifically, each record entry in the data store 114 can be viewed as a document. It includes a previously-encountered system prompt, a set of contextual features that describe the circumstance in which the digital assistant 104 generated the previously-generated system prompt, and a previously-encountered user response made by the user in response to the previously-generated system prompt. The prediction system 106 attempts to find the record entry that matches the current system prompt and its contextual features; it then uses the user response associated with that record entry as the predicted response. In one case, the prediction system 106 can use any search and/or ranking algorithm to solve this problem. For example, the prediction system 106 can use a machine-learned decision tree model to perform this task.

The prediction system's reliance on the surface or "raw" form of linguistic expressions is advantageous because it simplifies the generation of predicted responses. That is, the prediction system 106 does not require a process of extracting detail from the linguistic expressions (such as entity names) and storing the extracted detail in complex schemas.

FIGS. 2-5 show four respective examples of the operation of the computing environment 102 of FIG. 1. Each such figure shows a short dialogue between the user and the digital assistant (DA) 104 without the use of the prediction system 106. It then shows how the dialogue would change upon the introduction of the prediction system 106.

Figure 2:
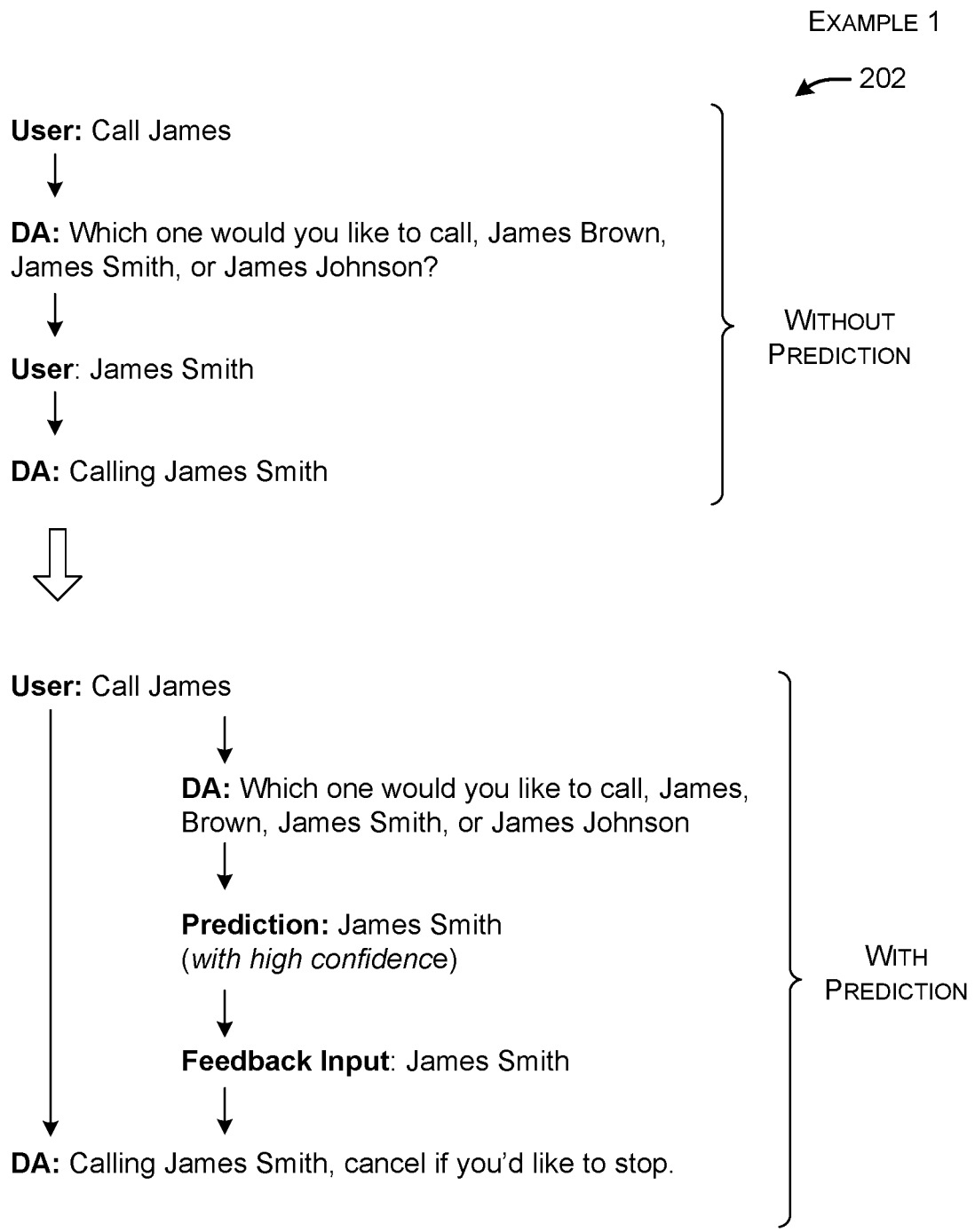

Beginning with a first example 202 of FIG. 2, assume that the user initiates the dialogue by commanding the digital assistant 104 to "Call James." Without the use of the prediction system 106, the digital assistant (DA) 104 responds with a system prompt which invites the user to specify which person named "James" in the user's contact book should be called. In response, the user more specifically identifies the person as "James Smith." The digital assistant 104 responds by notifying the user that it is calling the person named "James Smith."

With the use of the prediction system 106, assume that the digital assistant 104 responds in to the user's initial query ("Call James") in the same manner, e.g., by generating a system prompt that reads, "Which one would you like to call, James Brown, James Smith, or James Johnson?" The prediction system 106 then uses this system prompt, together with a set of contextual factors, to generate the predicted response of "James Smith." The prediction system 106 then feeds the predicted response ("James Smith") as input into the digital assistant 104, where it serves as a proxy user response. Here, the prediction system 106 prevents the digital assistant 104 from outputting the system prompt to the user; moreover, the prediction system 106 does not alert the user to the fact that it has automatically fed the predicted response ("James Smith") into the digital assistant 104.

As noted above, the prediction system 106 can choose this manner of operation when the predicted response has a high level of confidence associated with it. This would be true, for instance, when the prediction system 106 has ample evidence that the user almost always means "James Smith" when he makes a request to call "James." In other cases, the certainty of a predicted response can depend on contextual factors. For example, assume that James Smith is a colleague of the user's whom the user regularly calls during work hours, but rarely calls at night. Therefore, the prediction system 106 may decline to automatically initiate a call to this person if the user issues the command "Call James" at non-work hours.

The prediction system 106 terminates the transaction by sending a confirmation prompt to the user which notifies him that it is calling James Smith. The prompt invites the user to cancel this operation if the user did not intend to call James Smith. Hence, the first example 202 serves as an illustration in which the prediction system 106 applies the first dialogue action (by sending a predicted response back into the digital assistant 104), and the third dialogue action (by sending a confirmation prompt to the user).

Figure 3:
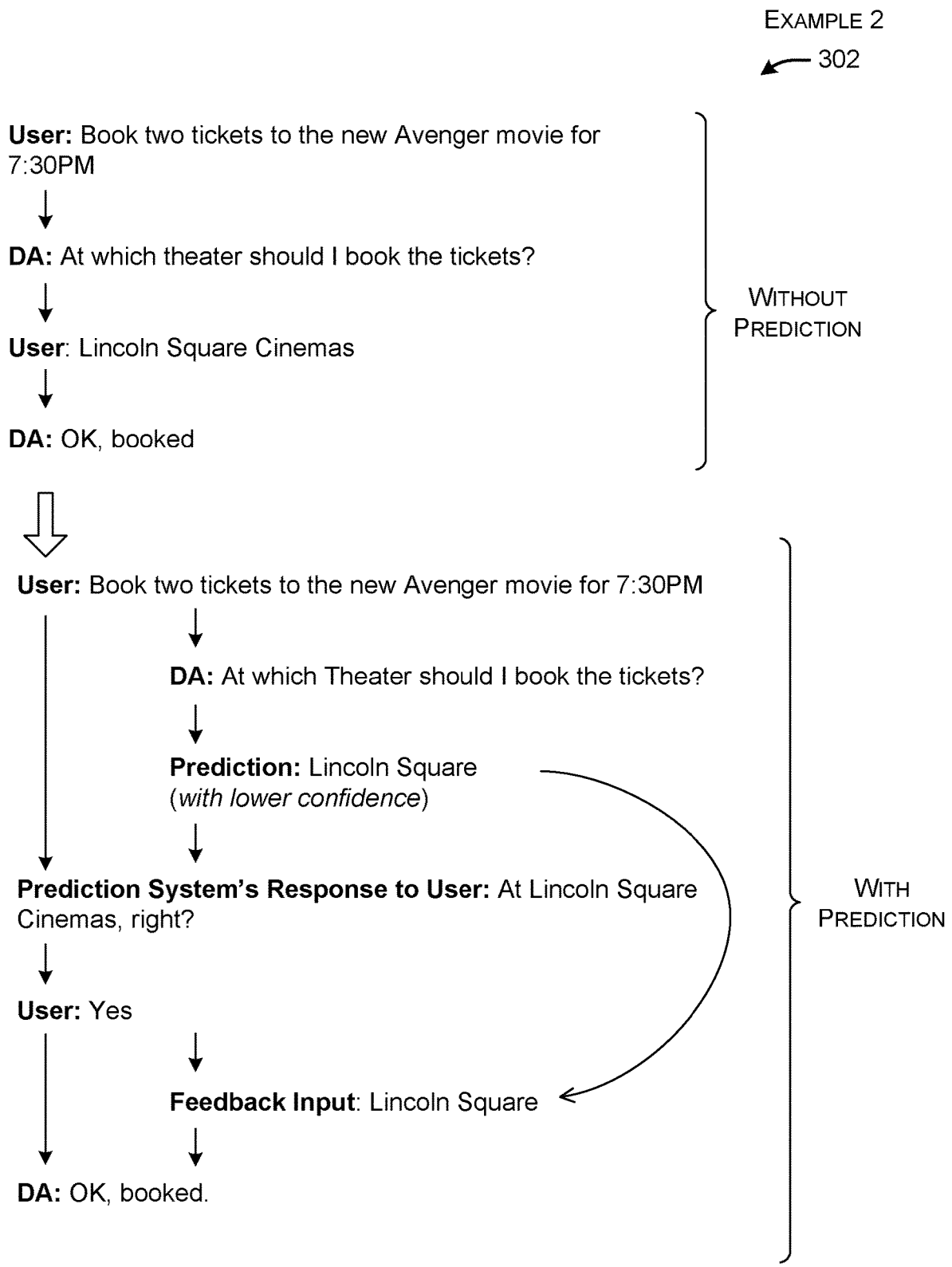

FIG. 3 shows a second example 302 in which, without the prediction system 106, the user begins a session by asking the digital assistant 104 to book two tickets to a movie. The digital assistant 104 responds by asking the user to specify what theater the user wishes to attend. The user responds, upon which the digital assistant 104 confirms that it has booked the tickets.

With the prediction system 106 in place, the digital assistant 104 again generates the same system prompt in response to the user's initial command, reading, "At which theater should I book the tickets?" The prediction system 106 operates on this system prompt, together with its contextual factors, to generate the predicted response of "Lincoln Square." Assume that the confidence level associated with this predicted response falls into an environment-specific intermediary range. As such, the prediction system 106 sends a confirmation prompt to the user which reads, "At Lincoln Square Cinemas, right?" This action differs from the example 202 of FIG. 2, where the prediction system 106 automatically feeds the predicted response as a proxy user response into the digital assistant 104, without asking for the approval of the user.

The user responds to the confirmation response by simply saying, "Yes." However, as given, this affirmation does not actually inform the digital assistant 104 what to do. (Note that, at this time, the prediction system 106 knows that the user intends to attend a particular theater, but the digital assistant 104 does not.) Hence, FIG. 3 shows that the prediction system 106 intercepts the user's reply ("Yes") and modifies it to "Lincoln Square." This is the kind of knowledge that the digital assistant 104 is expecting based on the original system prompt ("At which theater should I book the tickets?"). Finally, the digital assistant 104 confirms that it has performed the action requested by the user.

FIG. 4 shows third example 402 that is a variation of the preceding example 302 of FIG. 3. In this case, without the prediction system 106, the user again asks the digital assistant 104 to purchase two tickets to a movie. But here, the user omits both theater information and time-of-attendance information. The digital assistant 104 responds by first soliciting the name of the theater, and then the time. Other transactions can involve yet more dialogue turns.

With the prediction system 106 in place, the prediction system 106 first generates a predicted response which identifies the theater ("Lincoln Square"). It then feeds this predicted response back into the digital assistant 104 without notifying the user. This action causes the digital assistant 104 to generate another system prompt which solicits time-of-attendance information from the user. The prediction system 106 responds to this second prompt by predicting that the user's response will be "7:30 PM." At this stage, the prediction system 106 sends a confirmation prompt to the user which reads, "At Lincoln Center at 7:30?" Hence, the prediction system 106 asks the user to verify the correctness of two preceding predicted responses ("Lincoln Square," and "7:30 PM"). Assume that the user responds in the affirmative to this confirmation prompt. In response, the prediction system 106 feeds the modified user response "7:30 PM" into the digital assistant 104. It takes this action because this is the kind of information that the digital assistant 104 is expecting. (Note that the digital assistant 104 already knows that the user will attend the theater at Lincoln Square because the prediction system 106 automatically fed that information to the digital assistant 104 in a preceding cycle.) The digital assistant 104 terminates the transaction by confirming that it has purchased the tickets.

Figure 5:
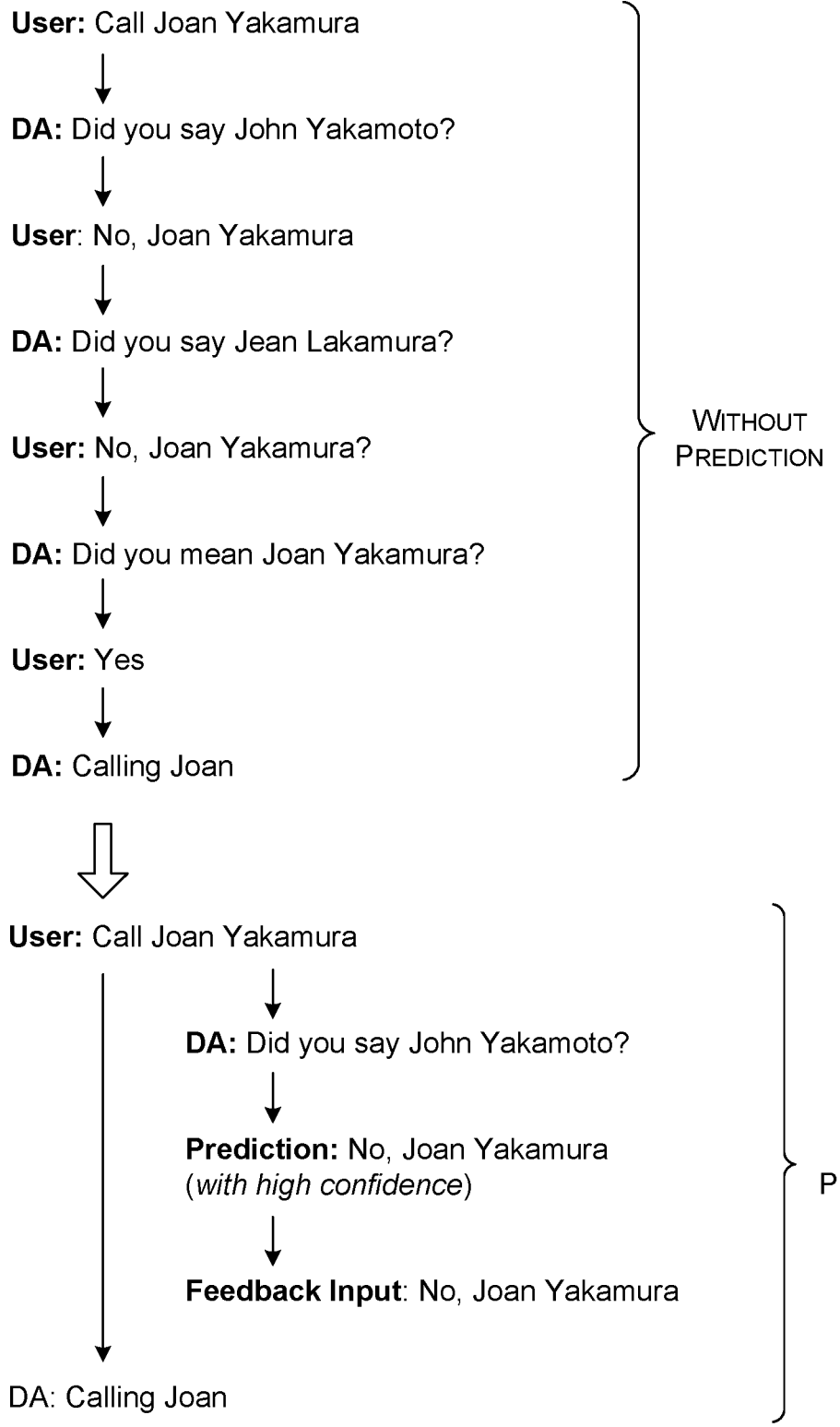

FIG. 5 shows a final example 502 in which, without prediction, the user makes several attempts to instruct the digital assistant 104 to call a person named "Joan Yakamura." But the digital assistant 104 requires the user to repeat this name three times before it correctly identifies the person that the user wishes to call. This user experience will typically frustrate the user.

With the prediction system 106 in place, assume that the digital system 104 begins by generating a system prompt which reads, "Did you say John Yakamoto?" The prediction system 106 maps this system prompt into the user's predicted response of "No, Joan Yakamura." It then feeds this predicted response into the digital assistant 104 because it has a high confidence value associated with it. It concludes by informing the user that it is in the process of calling "Joan." The user will therefore be unaware that the digital assistant 104 first incorrectly identified the person "John Yakamoto."

Note that, in the example of FIG. 5, the prediction system 106 overcomes the difficulty faced by the digital assistant 104 in correctly interpreting the user's input query. The prediction system 106 can do better than the digital assistant 104 because it is leveraging evidence which establishes the nexus between various inaccurate system prompts (such as "John Yakamoto") and the correct name ("Joan Yakamura"), which is information not necessarily available to the digital assistant's speech recognizer component and NLU component.

In summary to FIGS. 1-5, the prediction system 106 provides good user experience because it can reduce the number of system prompts that the user is required to respond to. But the prediction system 106 accomplishes this task in an intelligent manner based on the confidence level associated with each predicted response. In some cases, it asks the user to confirm an assumption, while in other cases it does not. The prediction system 106 also assists the digital assistant 104 in interpreting ambiguous input queries, as demonstrated in the example of FIG. 5.

FIG. 6 shows one implementation of the digital assistant 104 and the prediction system 106 of FIG. 1. More specifically, FIG. 6 shows the components of the digital assistant 104 using boxes with dashed-lined borders, and depicts the components of the prediction system 106 using boxes with solid-lined borders.

Beginning first with the digital assistant 104, an optional speech recognizer component 602 converts a stream of audio signals received from a microphone into text information. The audio signals convey the user's natural language input expression. The speech recognizer component 602 can perform this task using any speech recognizer technology, such as a Recurrent Neural Network (RNN) composed of Long Short-Term Memory (LSTM) units, a Hidden Markov Model (HMM), etc.

The speech recognizer component 602 is optional because, in another mode of input, the user may provide an input expression to the digital assistant 104 in text form via a keyboard input device or the like. The user may also receive the system prompts generated by the digital assistant 104 in text form.

A natural language understanding (NLU) component 604 interprets the text information provided by the speech recognizer component 602 (or as directly input by the user), to provide an interpreted input expression. Different NLU components 604 uses different analysis techniques. In one merely illustrative case, the NLU component 604 can use an optional domain determination component (not shown) to first determine the most probable domain associated with an input expression. A domain pertains to the general theme to which an input expression pertains. For example, the command "find Mission Impossible" pertains to a media search domain. An intent determination component (not shown) next determines an intent associated with the input expression. An intent corresponds to an objective that a user likely wishes to accomplish by submitting an input expression. For example, a user who submits the input expression "find Mission Impossible" intends to find a particular movie having the name of "Mission Impossible." A user who submits the command "buy Mission Impossible" intends to purchase this movie, and so on. A slot value determination component (not shown) then determines slot values in the input expression. The slot values correspond to information items that a skill component or application needs to perform a requested task, upon interpretation of the input expression. For example, the command, "find Jack Nicolson movies in the comedy genre" includes a slot value "Jack Nicolson" that identifies an actor having the name of "Jack Nicolson," and a slot value "comedy" corresponding to a requested genre of movies.

In one case, the NLU component 604 can implement its various subcomponents using one or more machine-learned models. For example, each of the domain determination component and the intent determination component can use any machine-trained classification model, such as a logistic regression model, a neural network model, a clustering-based model, a decision tree model, a Support Vector Machine (SVM) model, and so on. The slot value determination component may use a machine-learned Conditional Random Fields (CRF) model or a Recurrent Neural Network (RNN) model, etc. Alternatively, or in addition, the NLU component 604 can implement any of its subcomponents using one or more rules-based systems. For example, the intent determination component can apply a rule which posits that any input expression which contains the keyword "buy" pertains to a purchase-related intent.

A dialogue manager component 606 coordinates with the set of skill components (108, 110, . . . , 112) to provide an answer to the user's input expression. To do this, the dialogue manager component 606 identifies the skill component(s) that should be invoked, and then forwards the interpreted input expression provided by the NLU component 604 to the appropriate skill component(s). The dialogue manager component 606 can perform this task by consulting a set of rules which map the domain(s) and intent(s) identified by the NLU component 604 to one or more appropriate skill components that can handle those domain(s) and intent(s).

Each skill component itself can be implemented by any machine-learned model(s) and/or any rules-based engines, etc. In one case, a skill component can use a machine-learned sequence-to-sequence model to map the user's input expression to an output response. In another case, a skill component can respond to a user's input expression based on one or more pre-stored scripts. Each skill component and/or the dialogue manager component 606 also maintains information regarding the state of a dialogue in progress, e.g., by identifying the questions that have already been asked, and the answers that have already been given, with respect to the task that the user is attempting to complete.

A natural language generation (NLG) component 608 maps each answer given by a skill component into an output expression in a natural language, to provide the final system prompt given to the user. More specifically, a skill component may output its answer in parametric form. For instance, in the context of making a flight reservation, a skill component can provide an answer that specifies a flight number, a flight time, a flight status, and a message type. The message type identifies purpose of the message; here, the purpose of the message is to convey the flight status of a flight. The NLG component 608 converts this answer into a natural language expression, constituting the system prompt. It can do this using a lookup table, one or more machine-learned models, one or more rules-based engines, and so on. An optional voice synthesizer (not shown) can convert a text-based system prompt into a spoken system prompt.

The above-described composition of the digital assistant 104 is set forth by way of illustration, not limitation. Indeed, the prediction system 106 is designed to be agnostic with respect to the logic used by the digital assistant 104; the prediction system 106 can therefore be used in conjunction with digital assistants having any architecture and logic.

Now referring the prediction system 106, the prediction system 106 includes a predictor component 610 which converts an input system prompt into a predicted response. In one implementation, the prediction system 106 uses an information retrieval paradigm to provide a predicted response. In this context, the prediction system 106 attempts to find a record entry in the data store 114 that is the best match with respect to a current system prompt. It then uses the user response associated with that record entry as the predicted response. Here, the predicted response corresponds to an actual user response that has been encountered on one or more previous occasions. In another implementation, the prediction system 106 uses a machine-learned generative model to generate the predicted response. The weights of the generative model reflects knowledge gleaned from prior user responses, but the actual predicted response produced by this model is synthetic, meaning there is no necessity that it corresponds to a real previously-encountered user response.

The predictor component 610 includes a feature generation component 612 that generates a set of features, including, in part, features that describe the current system prompt. More specifically, the feature generation component 612 can convert the current system prompt into one or more feature vectors using any kind of encoder. For example, the feature generation component 612 can convert each word of the system prompt into a one-hot feature vector (which includes a "1" entry in the dimension of the vector associated with the word, and a "0" entry in other dimensions). Or the feature generation component 612 can use an n-gram technique to convert each word into a feature vector. For example, the feature generation component 612 can move a three-character window across a word, character by character. At each location, the feature generation component 612 can store a "1" entry in a dimension of the feature vector associated with the 3-character sequence demarcated by the window. For example, the feature generation component 612 can convert the word "hotel" into a vector having "1" entries in the appropriate dimensions for the sequences "#ho," "hot," "ote," "tel," and "el #," where the "#" symbol refers to a dummy token marking the beginning or ending of a sequence. If a word contains two or more instances of the same three-character sequence, the feature generation component 612 can store a count of the number of instances in the appropriate dimension of the feature vector. As a further process, the feature generation component 612 can optionally use any machine-learned model (such as a neural network) to convert a one-hot or n-gram feature vector into a higher-level form.

In addition, the feature generation component 612 can generate features associated with the contextual circumstances in which the current system prompt was generated. These features can include, but are not limited to: the time at which the user submitted whatever input expression triggered the generation of the system prompt; the location from which the user submitted the input expression; the input expression itself (which can be converted into a feature vector in the same manner described above); an identity of a skill component which generated the system prompt; an identity of a skill component (if any) that was used just prior to the current skill component in the current dialogue, and so on.

If an information retrieval paradigm is being used, the feature generation component 612 can produce similar features to those described above for the record entry in the data store 114 to which the current system prompt is being compared. More specifically, each record entry includes a previously-generated system prompt along with its contextual features. The feature generation component 612 can convert this information into a set of features in the same manner described above, e.g., in an offline and/or real-time process. In addition, the feature generation component 612 can generate one or more count-related features which describe the number of times that a user encountered the previously-generated system prompt associated with the record entry under consideration. In addition, the feature generation component 612 can generate one or more features that describe the relationship of the current system prompt and the previously-generated system prompt associated with the record entry under consideration, such as an edit distance feature, etc.

In one implementation, the feature generation component 612 can assemble all of the above-described features into a single feature vector, e.g., by filling in appropriate variables for different slots of the feature vector.

A forecaster component 614 then generates a score for each record entry in the data store 114, based on the feature vector provided by the feature generation component 612. That score describes a level of confidence that the record entry matches the current system prompt and its contextual features. The forecaster component 614 then chooses the record entry having the best score, corresponding to the record entry that has the highest level of confidence. In one implementation, the forecaster component 614 can use any machine-learned model to perform this task, such as a neural network of any type, a decision tree model, a linear regression model, a Support Vector Machine (SVM), etc., or any combination thereof. Alternatively, or in addition, the forecaster component 614 can use a rules-based engine to compare the current system prompt (and its contextual features) to each record entry under consideration.

As noted above, in still another case, the forecaster component 614 can use a machine-learned generative model of any type to map the current system prompt and its contextual factors into the predicted response, without directly using a previously-encountered user response verbatim. For example, the forecaster component 614 can use a sequence-to-sequence model to generate a predicted response based on various items of input information, including, but not limited to: the current system prompt, contextual features, record entries in the data store 114, etc. Such a model can be implemented, for instance, by a Recurrent Neural Network (RNN) composed of LSTM units.

In those cases in which a machine-trained model is used, a training system 616 generates the machine-trained model based on the record entries in the data store 114. In one case, the training system 616 can perform this task on a continuous basis as a user makes each response, or as the user completes each dialogue. In another case, the training system 616 can perform this task on a periodic basis, such as at the end of every hour, or every day, or every week, etc.

An update component 618 updates the data store 114 each time the user responds to a system prompt. It does this by adding a new record entry to the data store 114 which describes this event. To perform this task, the update component 618 receives input signals from various sources. For instance, the update component 618 receives input signals from the digital assistant 104 which describe a current system prompt, one or more previous system prompts, a user input expression, a current skill component, one or more previous skill components, etc. The update component 618 can receive other input signals that describe the current time (received from a time-keeping mechanism), current location (received from a position-determining mechanism, such as a GPS component), etc.

Advancing momentarily in the sequence of figures, FIG. 9 shows a small sample 902 of the data store 114. The sample 902 includes three rows associated with three respective record entries. As indicated there, each record entry identifies a system prompt, a set of contextual features pertaining to the circumstances in which the system prompt was issued, and the response made by the user in reply to the system prompt. Although not shown, the update component 618 can convert the system prompt and its contextual features to vectorized form prior to storing the record entry.

Note that, by virtue of the real-time operation of the update component 114, the forecaster component 614 can continue to improve its performance in the spans of time between training updates performed by the training system 616. This is because the data store 114 itself reveals patterns in the way the user responds to system prompts, even in the absence of retraining the predictor component's machine-learned model(s). By continuously updating the data store 114, the update component 618 continues to improve the reliability of the patterns exhibited in the record entries.

A decision component 620 determines what dialogue action to invoke in response to the predicted response generated by the predictor component 610, and its associated confidence value. As explained above, the dialogue actions include at least: (A) sending the predicted response to the digital assistant 104 without notifying the user; (B) sending the original system prompt to the user; and (C) sending a confirmation prompt to the user which invites the user to confirm the predicted response, e.g., by confirming the predicted response itself, and/or an action that is based on the predicted response.

A system response-filtering component (SRFC) 622 either passes the original system prompt to the user without modification, or produces a confirmation prompt based on the predicted response. The SRFC 622 can generate a confirmation prompt in different ways, such as by using a set of rules in conjunction with a library of prompt templates. For example, one kind of confirmation template asks the user whether the digital assistant 104 is authorized to act on the predicted response. Another kind of confirmation template notifies the user that the digital assistant 104 is currently acting on, or has already acted on, the predicted response; the template can then invite the user to cancel or reverse the action.

A user response-filtering component (URFC) 624 either passes the user's original user response through without modification, or modifies a user's response such that it is consistent with the input expectations of the digital assistant 104. For example, assume that a confirmation prompt asks the user to confirm that he or she wishes to attend the Lincoln Square Cinemas in Bellevue, Wash. The user will respond by saying either "yes" or "no." The URFC 624 will substitute the actual user response with the response that the digital assistant 104 is expecting, namely "Lincoln Square Cinemas." Assume, instead, that the user says "no" in response to the confirmation prompt. The URFC 624 and SRFC 622 can respond to this event using different environment-specific strategies. In one approach, the URFC 624 instructs the SRFC 622 to issue the original system prompt, rather than the confirmation prompt. The original prompt reads, "At which theater should I book the tickets?" In another approach, the SRFC 622 can offer another confirmation prompt to the user based on another predicted response provided by the predictor component 610 (e.g., which may correspond to the record entry having the second-best matching score, the user having already rejected the record entry having the best matching score). The URFC 624 can perform the above-described functions in the same manner as the SRFC 622, e.g., using a set of rules in conjunction with a library of templates.

The update component 618 can also store information in the data store 114 which reflects a user's rejection of a predicted response. For example, the update component 618 can remove or otherwise discount a record entry that was used to formulate the rejected predicted response. In addition, the training system 616 can use the user's rejection of the predicted response as a negative training example in its next training update.

Figure 7:
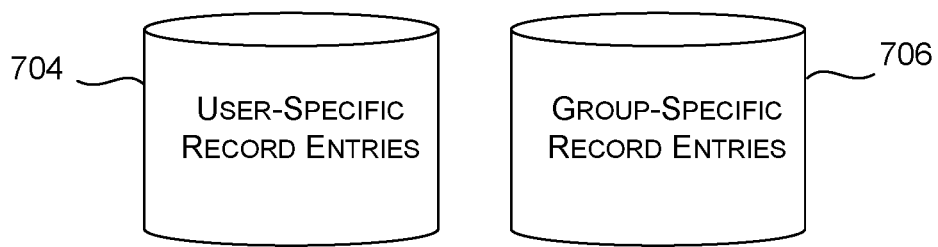
FIG. 7 shows two types of data stores that may be maintained by the prediction system of FIGS. 1 and 6.

The prediction system 106 can be modified to incorporate yet other refinements. According to one refinement, and by reference to FIG. 7, the prediction system 106 can maintain a first data store 702 that provides record entries associated with a particular user, and a second data store 704 that provides record entries associated with a group of users, or potentially all users. The first data store 702 thereby provides a user-specific resource, while the second data store 704 provides a group-specific or global resource. The prediction system 106 can rely on these two data stores (702, 704) in different ways. For example, the prediction system 106 can rely on the second data store 704 when there is insufficient evidence in the first data store 702 to generate a predicted response with sufficient confidence. Or the prediction system 106 can use evidence in the second data store 704 to bolster or devalue a conclusion reached on the basis of the first data store 702, or vice versa. Or the prediction system 106 can switch between the use of the first and second data stores (702, 704) depending on contextual factors, such as the topic of the system prompt under consideration, the preferences of the user, the time of day, the location, etc.

Returning to FIG. 6, as another refinement, the prediction system 106 can use various strategies to mix exploitation and exploration in its selection of a predicted response. The prediction system 106 pursues exploitation when it chooses a predicted response having the highest confidence value; the confidence value, in turn, is based on the currently available evidence in the data store 114. The prediction system 106 pursues exploration when it chooses a predicted response having less certain value, in hopes it will prove to be a successful match, as well as provide new information to the model.

More specifically, in one illustrative strategy, the prediction system 106 pursues exploration by the manner in which it selects among record entries having different levels of confidence associated with them. For instance, the prediction system 106 can randomly select a record entry having a less-than-optimal confidence value. A less-than-optimal confidence value is a confidence value that is less than one or more other matching record entries. The user can set a parameter p which governs the rate at which the prediction system 106 chooses a less-than-optimal record entry.

As another refinement, the prediction system 106 can adjust its operation based on setting signals 626 sent by the skill components (108, 110, . . . , 112). Each setting signal provided by a skill component notifies the prediction system 106 of the extent to which the skill component authorizes the use of predicted responses. For example, a skill component may specify that the prediction system 106 is prohibited from generating a predicted response for any system prompt which derives from an answer given by that skill component. Or a skill component may specify how the prediction system 106 is to perform its operation, e.g., by specifying the data store(s), model(s), features, etc. used by the prediction system 106. The skill component may also specify an extent to which the prediction system 106 uses exploitation and exploration in generating its predicted responses.

As another refinement, the predictor component 610 can feed a predicted response to the speech recognition component 602 and/or the NLU component 604. The predicted response will assist these components in interpreting the forthcoming actual user response. This strategy is appropriate at least for dialogue action (B) described above, in which the prediction system 106 sends the original system prompt to the user.

Figure 8:
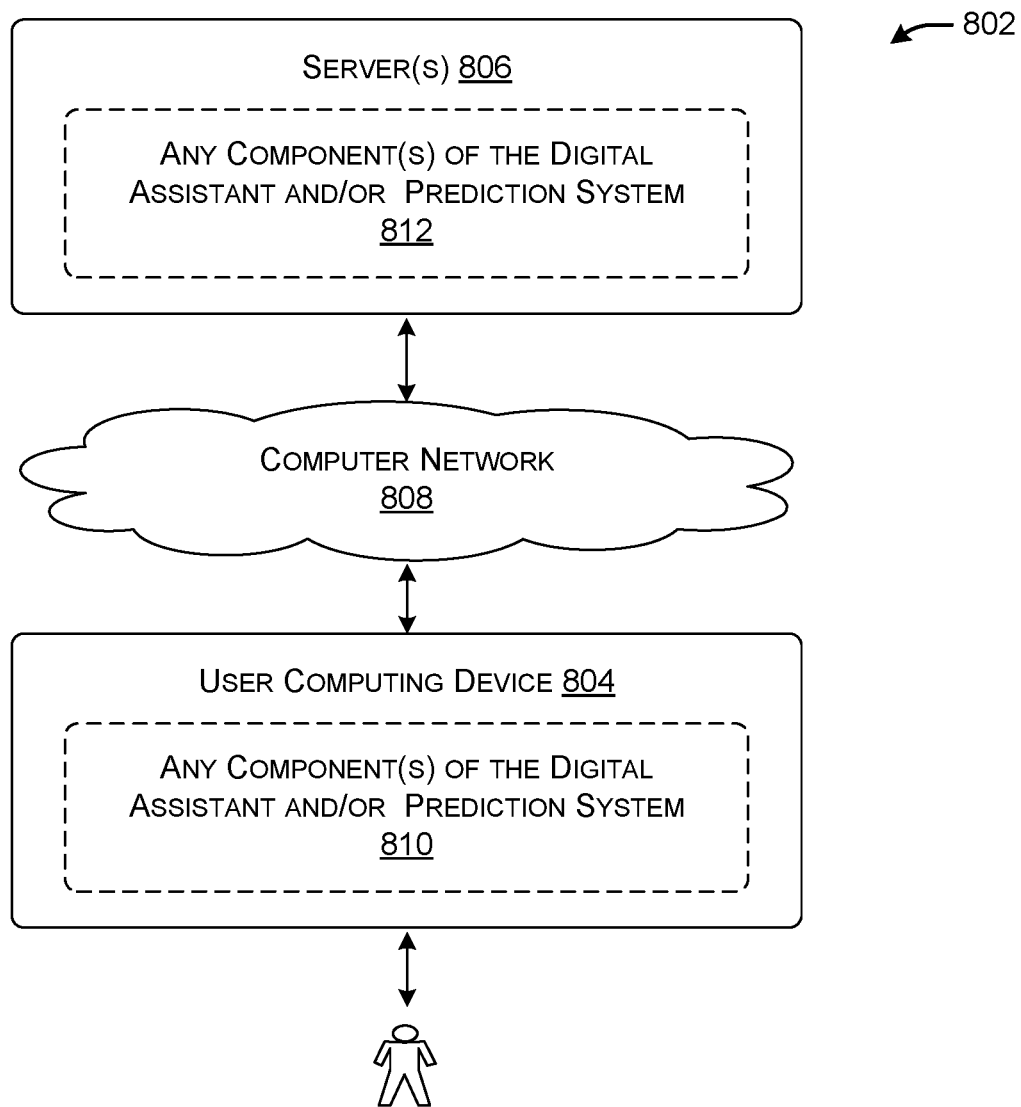
FIG. 8 shows equipment that can be used to implement the computing environment of FIGS. 1 and 6.

FIG. 8 shows equipment 802 that can be used to implement the computing environment 102 of FIGS. 1 and 6. The equipment 802 includes a user computing device 804 coupled to one or more servers 806 via a computer network 808. The user computing device 804 can correspond to a personal desktop computing device, a laptop computing device, any handheld computing device (such as a smartphone, tablet computing device, etc.), a wearable computing device, a game console, a mixed-reality computing device, and so on. The computer network 808 can correspond to a local area network, a wide area network (e.g., the Internet), one or more point-to-point links, etc.

FIG. 8 also generally indicates that the user computing device 804 can host any component(s) 810 of the digital assistant 104 and/or the prediction system 106. Likewise, the server(s) 806 can host any component(s) 812 of the digital assistant 104 and/or the prediction system 106. In one case, for instance, the user computing device 804 implements both the digital assistant 104 and the prediction system 106 in their respective entireties, thus requiring no interaction with any remote system. In another case, the server(s) 806 implement the digital assistant 104 and the prediction system 106 in their entireties. Here, a user may interact with the digital assistant 104 via a browser program provided by the user computing device 804. In another case, the logic associated with the digital assistant 104 and/or the prediction system 106 is distributed between the user computing device 804 and the server(s) 806 in any manner. Further note that the prediction system 106 may be co-located with the digital assistant 104 with which it interacts, or can be separate therefrom.

B. Illustrative Processes

Figure 10:
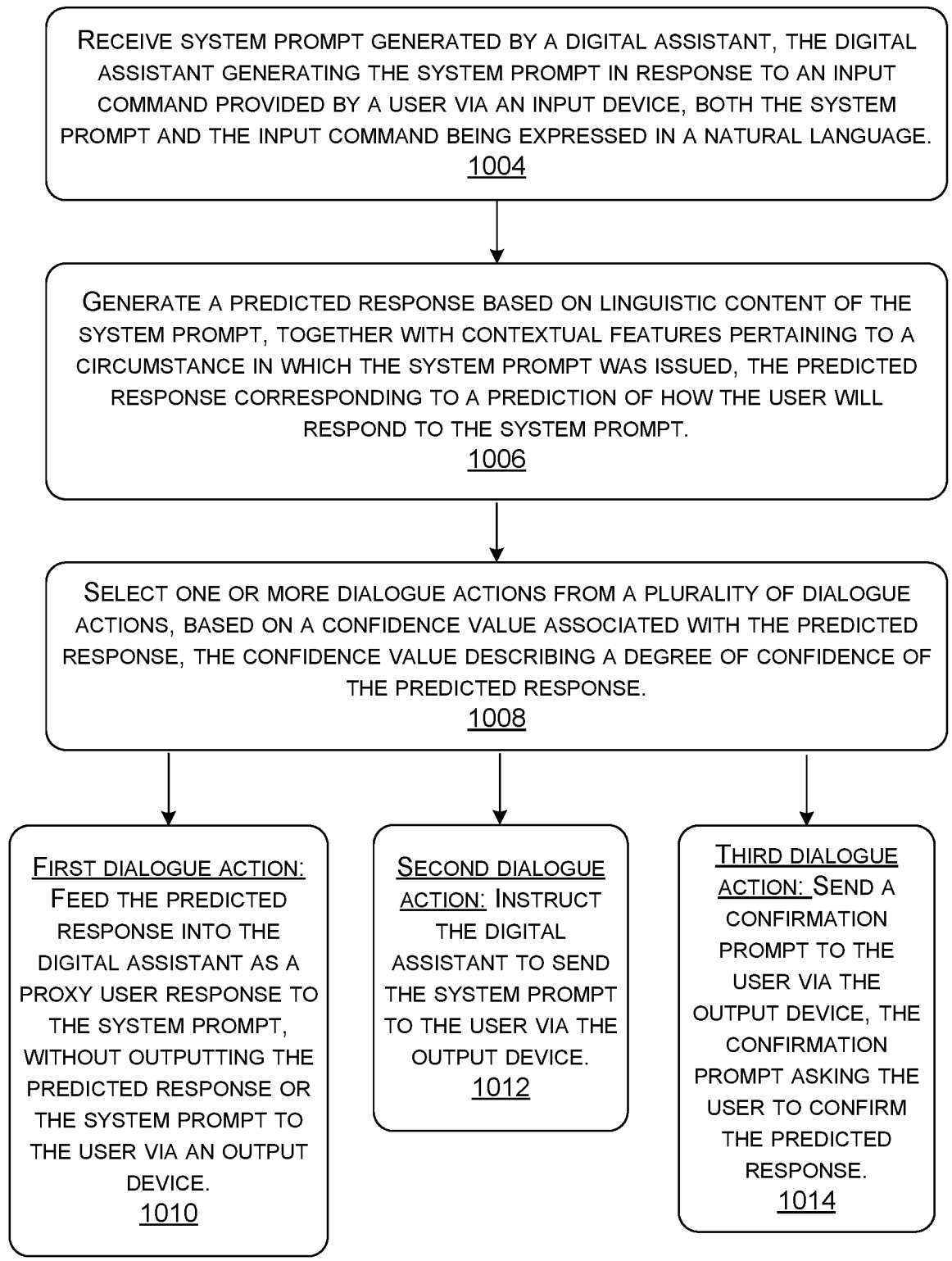
FIG. 10 is a flowchart that shows one illustrative manner of operation of the prediction system of FIGS. 1 and 6.

FIG. 10 shows a process 1002 that explains the operation of the prediction system 106 of Section A in flowchart form. Since the principles underlying the operation of the prediction system 106 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

In block 1004, the prediction system 106 receives a system prompt generated by the digital assistant 104. The digital assistant 104 generates the system prompt in response to an input command provided by a user via an input device, both the system prompt and the input command being expressed in a natural language. In block 1006, the prediction system 106 generates a predicted response based on linguistic content of the system prompt, together with contextual features pertaining to a circumstance in which the system prompt was issued, the predicted response corresponding to a prediction of how the user will respond to the system prompt. In block 1008, the prediction system 106 selects one or more dialogue actions from a plurality of dialogue actions, based on a confidence value associated with the predicted response, the confidence value describing a degree of confidence of the predicted response. Block 1010 describes a first dialogue action. It involves feeding the predicted response into the digital assistant as a proxy user response to the system prompt, without outputting the predicted response or the system prompt to the user via an output device. Block 1012 describes a second dialogue action. It involves instructing the digital assistant to send the system prompt to the user via the output device. Block 1014 describes a third dialogue action. It involves sending a confirmation prompt to the user via the output device, the confirmation prompt asking the user to confirm the predicted response, e.g., by confirming the predicted response itself and/or an action that is based on the proposed response.

The operation of generating of the predicted response (in block 1006) is based on the data store 114 that contains a plurality of record entries, each record entry containing: a previously-generated system prompt; contextual features pertaining to a circumstance in which the previously-generated system prompt was issued; and a previously-encountered user response to the previously-generated system prompt.

C. Representative Computing Functionality

Figure 11:
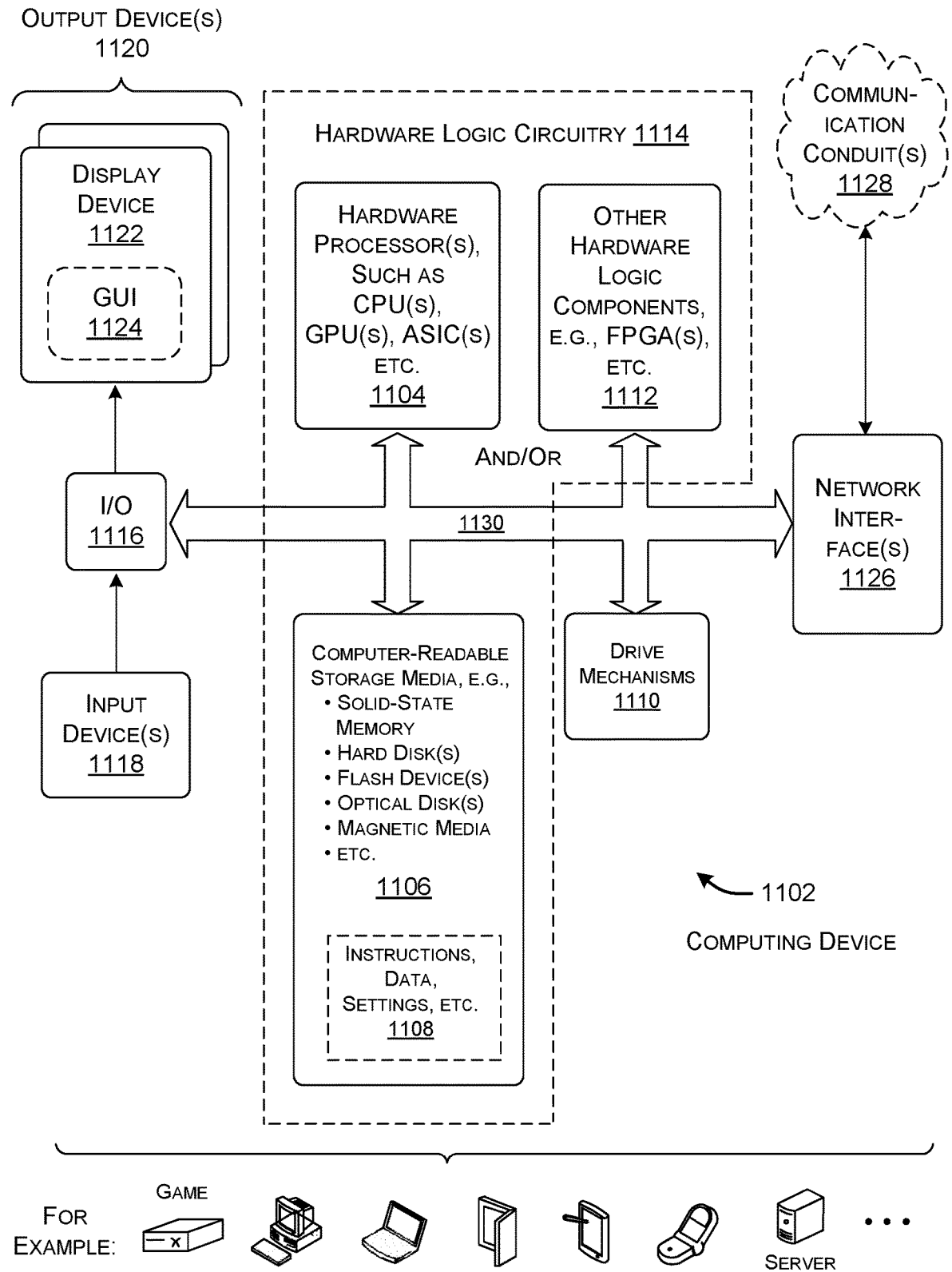
FIG. 11 shows an illustrative type of computing device that can be used to implement any aspect of the features shown in the foregoing drawings.

FIG. 11 shows a computing device 1102 that can be used to implement any aspect of the mechanisms set forth in the above-described figures. For instance, with reference to FIG. 8, the type of computing device 1102 shown in FIG. 11 can be used to implement any of the server(s) 806 or the user computing device 804. In all cases, the computing device 1102 represents a physical and tangible processing mechanism.

The computing device 1102 can include one or more hardware processors 1104. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1102 can also include computer-readable storage media 1106, corresponding to one or more computer-readable media hardware units. The computer-readable storage media 1106 retains any kind of information 1108, such as machine-readable instructions, settings, data, etc. Without limitation, for instance, the computer-readable storage media 1106 may include one or more solid-state devices, one or more magnetic hard disks, one or more optical disks, magnetic tape, and so on. Any instance of the computer-readable storage media 1106 can use any technology for storing and retrieving information. Further, any instance of the computer-readable storage media 1106 may represent a fixed or removable component of the computing device 1102. Further, any instance of the computer-readable storage media 1106 may provide volatile or non-volatile retention of information.

The computing device 1102 can utilize any instance of the computer-readable storage media 1106 in different ways. For example, any instance of the computer-readable storage media 1106 may represent a hardware memory unit (such as Random Access Memory (RAM)) for storing transient information during execution of a program by the computing device 1102, and/or a hardware storage unit (such as a hard disk) for retaining/archiving information on a more permanent basis. In the latter case, the computing device 1102 also includes one or more drive mechanisms 1110 (such as a hard drive mechanism) for storing and retrieving information from an instance of the computer-readable storage media 1106.

The computing device 1102 may perform any of the functions described above when the hardware processor(s) 1104 carry out computer-readable instructions stored in any instance of the computer-readable storage media 1106. For instance, the computing device 1102 may carry out computer-readable instructions to perform each block of the process 1002 described in Section B.

Alternatively, or in addition, the computing device 1102 may rely on one or more other hardware logic components 1112 to perform operations using a task-specific collection of logic gates. For instance, the hardware logic component(s) 1112 may include a fixed configuration of hardware logic gates, e.g., that are created and set at the time of manufacture, and thereafter unalterable. Alternatively, or in addition, the other hardware logic component(s) 1112 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 11 generally indicates that hardware logic circuitry 1114 includes any combination of the hardware processor(s) 1104, the computer-readable storage media 1106, and/or the other hardware logic component(s) 1112. That is, the computing device 1102 can employ any combination of the hardware processor(s) 1104 that execute machine-readable instructions provided in the computer-readable storage media 1106, and/or one or more other hardware logic component(s) 1112 that perform operations using a fixed and/or programmable collection of hardware logic gates. More generally stated, the hardware logic circuitry 1114 corresponds to one or more hardware logic components of any type(s) that perform operations based on logic stored in and/or otherwise embodied in the hardware logic component(s).

In some cases (e.g., in the case in which the computing device 1102 represents a user computing device), the computing device 1102 also includes an input/output interface 1116 for receiving various inputs (via input devices 1118), and for providing various outputs (via output devices 1120). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1122 and an associated graphical user interface presentation (GUI) 1124. The display device 1122 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1102 can also include one or more network interfaces 1126 for exchanging data with other devices via one or more communication conduits 1128. One or more communication buses 1130 communicatively couple the above-described components together.

The communication conduit(s) 1128 can be implemented in any manner, e.g., by a local area computer network, a wide area computer network (e.g., the Internet), point-to-point connections, etc., or any combination thereof. The communication conduit(s) 1128 can include any combination of hardwired links, wireless links, routers, gateway functionality, name servers, etc., governed by any protocol or combination of protocols.

FIG. 11 shows the computing device 1102 as being composed of a discrete collection of separate units. In some cases, the collection of units may correspond to discrete hardware units provided in a computing device chassis having any form factor. FIG. 11 shows illustrative form factors in its bottom portion. In other cases, the computing device 1102 can include a hardware logic component that integrates the functions of two or more of the units shown in FIG. 1. For instance, the computing device 1102 can include a system on a chip (SoC or SOC), corresponding to an integrated circuit that combines the functions of two or more of the units shown in FIG. 11.

The following summary provides a non-exhaustive set of illustrative aspects of the technology set forth herein.

According to a first aspect, one or more computing devices are described for controlling interaction with a digital assistant. The computing device(s) include hardware logic circuitry, the hardware logic circuitry corresponding to: (a) one or more hardware processors that perform operations by executing machine-readable instructions stored in a memory, and/or (b) one or more hardware logic components that perform operations using a task-specific collection of logic gates. The operations include: receiving a system prompt generated by a digital assistant, the digital assistant generating the system prompt in response to an input command provided by a user via an input device, both the system prompt and the input command being expressed in a natural language; generating a predicted response based on linguistic content of the system prompt, together with contextual features pertaining to a circumstance in which the system prompt was issued, the predicted response corresponding to a prediction of how the user will respond to the system prompt; and selecting one or more dialogue actions from a plurality of dialogue actions, based on a confidence value associated with the predicted response, the confidence value describing a degree of confidence of the predicted response. A first dialogue action involves feeding the predicted response into the digital assistant as a proxy user response to the system prompt, without outputting the predicted response or the system prompt to the user via an output device. The first dialogue action has an effect of expediting interaction between the user and the digital assistant by not requiring the user to respond to the system prompt. The operation of generating the predicted response is based on a data store that contains a plurality of record entries, each record entry containing: a previously-generated system prompt; a set of contextual features pertaining to a circumstance in which the previously-generated system prompt was issued; and a previously-encountered user response to the previously-generated system prompt.

According to a second aspect, the operation of selecting chooses the first dialogue action when the confidence value is above a prescribed threshold value.

According to a third aspect, the predicted response that is fed back into the digital assistant contains a correction to an inaccurate assumption in the system prompt.

According to a fourth aspect, the operations further include: receiving another system prompt generated by the digital assistant in response to the predicted response; and generating another predicted response based on the other system prompt.

According to a fifth aspect, a second dialogue action involves: instructing the digital assistant to send the system prompt to the user via the output device, the digital assistant subsequently receiving an actual user response to the system prompt.

According to a sixth aspect, dependent on the fifth aspect, the operation of selecting chooses the second dialogue action when the confidence value is below a prescribed threshold value.

According to a seventh aspect, dependent on the fifth aspect, the operations further include sending the predicted response to the digital assistant for use by the digital assistant in interpreting the actual user response.

According to an eighth aspect, dependent on the fifth aspect, the operations further include adding a new record entry to the data store which includes the system prompt, contextual features pertaining to a circumstance in which the system prompt was issued, and the actual user response.

According to a ninth aspect, a third dialogue action involves: sending a confirmation prompt to the user via the output device, the confirmation prompt asking the user to confirm the predicted response, the digital assistant subsequently receiving an actual user response to the confirmation prompt.

According to a tenth aspect, dependent on the ninth aspect, the confirmation prompt informs the user that the digital assistant is currently taking an action, has already taken the action, or will take the action.

According to an eleventh aspect, dependent on the ninth aspect, the confirmation prompt asks the user to confirm the predicted response before the digital assistant takes an action based on the predicted response.

According to a twelfth aspect, dependent on the ninth aspect, the operations further include, upon the user confirming the predicted response: modifying the actual user response so that it expresses the predicted response, to produce a modified user response, when the actual user response indicates acceptance of the predicted response; and feeding the modified user response into the digital assistant as a proxy user response.

According to a thirteenth aspect, the operation of generating of the predicted response operates by: using the system prompt and the contextual features to find a matching record entry in the data store; and choosing a previously-encountered user response that is associated with the matching record entry as the predicted response.

According to a fourteenth aspect, the operation of generating the predicted response involves, at selected times devoted to promoting exploration over exploitation within a solution space that defines a set of possible predicted responses that can be chosen, choosing a predicted response among the set of possible predicted responses, at least one non-chosen predicted response in the set having a higher confidence value than the predicted response that is chosen.

According to a fifteenth aspect, the digital assistant includes at least: a natural language understanding (NLU) component for interpreting the user input command, to provide an interpreted user command; a dialogue manager for coordinating with one or more skill components to provide an answer to the interpreted user command; and a natural language generator (NGU) component for generating the system prompt, in the natural language, based on the answer.

According to a sixteenth aspect, dependent on the fifteenth aspect, the operations further include: receiving a setup signal from a skill component; and using the setup signal to govern a manner in which the predicted responses are generated for answers provided by that skill component.

According to a seventeenth aspect, a method is described, implemented by one or more computing devise, for controlling interaction with a digital assistant. The method includes, in a prediction system: receiving a system prompt generated by a digital assistant, the digital assistant generating the system prompt in response to an input command provided by a user via an input device, both the system prompt and the input command being expressed in a natural language; generating a predicted response based on linguistic content of the system prompt, together with contextual features pertaining to a circumstance in which the system prompt was issued, the predicted response corresponding to a prediction of how the user will respond to the system prompt; and according to a first dialogue action, feeding the predicted response into the digital assistant as a proxy user response to the system prompt. The prediction system generates the predicted response based on a data store that contains a plurality of record entries, each record entry containing: a previously-generated system prompt; a set of contextual features pertaining to a circumstance in which the previously-generated system prompt was issued; and a previously-encountered user response to the previously-generated system prompt. Further, the prediction system provides a user personalization function external to one or more skill components provided by the digital assistant.

According to an eighteenth aspect, the method does not involve outputting the predicted response or the system prompt to the user via an output device.

According to a nineteenth aspect, the method further involves, according to a second dialogue action: sending a confirmation prompt to the user via the output device, the confirmation prompt asking the user to confirm the predicted response, the digital assistant subsequently receiving an actual user response to the confirmation prompt; modifying the actual user response so that it expresses the predicted response, to produce a modified user response, when the actual user response indicates acceptance of the predicted response; and feeding the modified user response into the digital assistant as a proxy user response.

According to a twentieth aspect, a computer-readable storage medium is described for storing computer-readable instructions. The computer-readable instructions, when executed by one or more hardware processors, perform a method that includes receiving a system prompt generated by a digital assistant, the digital assistant generating the system prompt in response to an input command provided by a user via an input device, both the system prompt and the input command being expressed in a natural language. The digital assistant includes: a natural language understanding (NLU) component for interpreting the user input command, to provide an interpreted user command; a dialogue manager for coordinating with one or more skill components to provide an answer to the interpreted user command; and a natural language generator (NGU) component for generating the system prompt, in the natural language, in reply to the answer. The method further includes: generating a predicted response based on linguistic content of the system prompt, together with contextual features pertaining to a circumstance in which the system prompt was issued, the predicted response corresponding to a prediction of how the user will respond to the system prompt; and selecting one or more dialogue actions from a plurality of dialogue actions, based on a confidence value associated with the predicted response, the confidence value describing a degree of confidence of the predicted response. A first dialogue action involves feeding the predicted response into the digital assistant as a proxy user response to the system prompt, without outputting the predicted response or the system prompt to the user via an output device. A second dialogue action involves instructing the digital assistant to send the system prompt to the user via the output device. A third dialogue action involves sending a confirmation prompt to the user via the output device, the confirmation prompt asking the user to confirm the predicted response. The operation of generating the predicted response is based on a data store that contains a plurality of record entries, each record entry containing: a previously-generated system prompt; contextual features pertaining to a circumstance in which the previously-generated system prompt was issued; and a previously-encountered user response to the previously-generated system prompt.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the contextual of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the contextual of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
a processor; and
a memory coupled to the processor and storing instructions that, when executed by the processor, perform operations, comprising:
receiving a natural language system prompt generated by a digital assistant;
generating a predicted response that comprises a prediction of how an individual will respond to the system prompt, the predicted response being generated based, at least in part, on at least one of:
a first contextual information associated with the system prompt;
a previously-generated system prompt;
a second contextual information describing a circumstance in which the previously-generated system prompt was issued; and
a previously-encountered response to the previously-generated system prompt;
selecting a dialogue action from a plurality of dialogue actions based, at least in part, on a confidence level associated with the predicted response, wherein the dialogue action expedites an interaction between the individual and the digital assistant by automatically providing the dialog action as a proxy response to the system prompt and by not providing the system prompt; and
causing the selected dialog action to be performed.

2. The system of claim 1, further comprising instructions for selecting the dialogue action when the confidence level associated with the predicted response is above a threshold value.

3. The system of claim 1, further comprising instructing the digital assistant to provide the system prompt to the individual.

4. The system of claim 1, wherein the second contextual information includes a received query that caused generation of the previously-generated system prompt.

5. The system of claim 1, wherein the second contextual information includes a time at which a query was received that caused generation of the previously-generated system prompt.

6. The system of claim 1, wherein the second contextual information includes a location at which a query was received that caused generation of the previously-generated system prompt.

7. The system of claim 1, further comprising instructions for providing a confirmation prompt to the individual, the confirmation prompt being based, at least in part, on providing the predicted response as the proxy response to the system prompt.

8. A method, comprising:
receiving a natural language system prompt generated by a digital assistant;
generating a predicted response that comprises a prediction of how an individual will respond to the system prompt, the predicted response being generated based, at least in part, on at least one of:
a previously-generated system prompt;
contextual information associated with the system prompt or the previously-generated system prompt; and
a previously-encountered response to the previously-generated system prompt;
selecting a dialogue action from a plurality of dialogue actions based, at least in part, on a confidence level associated with the predicted response, wherein the dialogue action expedites an interaction between the individual and the digital assistant by automatically providing the dialog action as a proxy response to the system prompt and by not providing the system prompt and
and
performing the selected dialog action.

9. The method of claim 8, further comprising selecting the dialogue action when a confidence level associated with the predicted response is above a threshold value.

10. The method of claim 8, further comprising instructing the digital assistant to provide the system prompt to the individual.

11. The method of claim 8, wherein the contextual information includes a received query that caused generation of the previously-generated system prompt.

12. The method of claim 8, wherein the contextual information includes a time at which a query was received that caused generation of the previously-generated system prompt.

13. The method of claim 8, wherein the contextual information includes a location at which a query was received that caused generation of the previously-generated system prompt.

14. The method of claim 8, further comprising providing a confirmation prompt to the individual, the confirmation prompt being further based on providing the predicted response as the proxy response to the system prompt.

15. A method, comprising:
receiving a natural language system prompt generated by a digital assistant;
generating a predicted response including a prediction of how an individual will respond to the system prompt, the predicted response being generated based, at least in part, on a record entry in a data store, the record entry comprising one or more of:
a previously-generated system prompt;
contextual information associated with the system prompt or the previously-generated system prompt; and
a previously-encountered response to the previously-generated system prompt;
selecting a dialogue action from a plurality of dialogue actions based, at least in part, on a confidence level associated with the predicted response, wherein the dialogue action expedites an interaction between the individual and the digital assistant by automatically providing the dialog action as a proxy response to the system prompt and by not providing the system prompt; and
performing the selected dialog action.

16. The method of claim 15, wherein the selected dialog action from the plurality of dialogue actions comprises one of:
providing the predicted response to the digital assistant as the proxy response to the system prompt;
instructing the digital assistant to provide the system prompt to the individual; and
providing a confirmation prompt to the individual, the confirmation prompt being based, at least in part, on the predicted response.

17. The method of claim 16, further comprising providing the confirmation prompt to the individual, the confirmation prompt being further based on providing the predicted response as the proxy response to the system prompt.

18. The method of claim 15, wherein the contextual information includes a time at which a query was received that caused generation of the previously-generated system prompt.

19. The method of claim 15, wherein the contextual information includes a location at which a query was received that caused generation of the previously-generated system prompt.

20. The method of claim 15, wherein the contextual information includes a received query that caused generation of the previously-generated system prompt.

* * * * *